United States Patent [19]

Falco et al.

[11] Patent Number: 5,343,776
[45] Date of Patent: Sep. 6, 1994

[54] HANDLE GRIP COVER AND PROCESS FOR MAKING SAME

[75] Inventors: Robert N. Falco, Indianapolis, Ind.; Colin Williams, Signal Mountain, Tenn.

[73] Assignee: Cabot Corporation, Boston, Mass.

[21] Appl. No.: 931,796

[22] Filed: Aug. 18, 1992

Related U.S. Application Data

[63] Continuation of Ser. No. 592,403, Oct. 3, 1990, abandoned, which is a continuation-in-part of Ser. No. 555,136, Jul. 19, 1990.

[51] Int. Cl.$^5$ .................. B62D 1/06; G05G 1/04; B32B 3/00
[52] U.S. Cl. .................. 74/558; 74/558.5; 428/64; 428/260; 428/432; 428/36.1; 428/34.1; 428/36.9
[58] Field of Search .................. 74/558, 558.5, 552, 74/557; 156/86, 289; 428/64, 260, 263, 272, 254, 265, 267, 492, 36.1, 34.1, 36.8, 36.9

[56] References Cited

U.S. PATENT DOCUMENTS

| | | | |
|---|---|---|---|
| 2,121,963 | 6/1938 | Goit | 74/558 |
| 2,226,866 | 12/1940 | Lipschultz | 74/558 |
| 2,227,579 | 1/1941 | Harley | 74/558 |
| 2,270,902 | 1/1942 | Rubissow | 74/558 |
| 3,802,291 | 4/1974 | Young et al. | 74/558 |
| 4,149,921 | 4/1979 | Stannard | 428/267 |
| 4,381,579 | 5/1983 | Rumpp | 16/111 |
| 4,390,585 | 6/1983 | Holden | 428/265 |
| 4,415,954 | 11/1983 | Schaefer | 362/202 |
| 4,416,166 | 11/1983 | Jannard et al. | 74/551.9 |
| 4,441,382 | 4/1984 | Snooks | 74/558 |
| 4,455,334 | 6/1984 | Ogino et al. | 428/34.1 |
| 4,476,742 | 10/1984 | Midgley | 74/551.9 |
| 4,567,093 | 1/1986 | Sogabe et al. | 428/267 |
| 4,685,987 | 8/1987 | Fick | 428/247 X |
| 4,729,860 | 3/1988 | Leach | 428/36.1 X |
| 4,738,339 | 4/1988 | Taylor | 428/36.1 X |
| 4,739,674 | 4/1988 | Hori | 74/551.9 |
| 4,758,470 | 7/1988 | Koyama | 74/558 X |
| 4,761,333 | 8/1988 | Takimoto et al. | 74/558 X |
| 4,788,759 | 12/1988 | Yano et al. | 74/558 X |
| 4,828,909 | 5/1989 | Davis et al. | 428/254 |
| 4,929,497 | 5/1990 | Mitchell et al. | 428/265 |
| 5,028,464 | 7/1991 | Shigetoh | 428/36.1 X |
| 5,087,512 | 2/1992 | Vihlein et al. | 428/263 X |

FOREIGN PATENT DOCUMENTS

| | | | |
|---|---|---|---|
| 0045032 | 3/1982 | Japan | 428/36.1 |
| 0188564 | 8/1988 | Japan | 74/558 |

Primary Examiner—Vinh T. Luong
Attorney, Agent, or Firm—Harry J. Gwinnell

[57] ABSTRACT

An improved handle grip cover formed of a knitted, braided, or woven tubular shaped material impregnated with a synthetic or natural elastomer. The grip cover is fabricated by placing a tubular shaped material, preferably elastic, over a form with a non-stick surface, and impregnating the tubular shaped material with a synthetic or natural elastomer. The tubular material is then cured, and peeled off of the form and trimmed to the desired length. The grip cover may be applied to a handle of a manual tool, a power tool, a piece of athletic equipment, or other article generally gripped by the hand.

10 Claims, 2 Drawing Sheets

HANDLE GRIP COVER AND PROCESS FOR MAKING SAME

This application is a continuation of commonly assigned, copending application Ser. No. 07/592,406, filed on Oct. 3, 1990 which is a continuation-in-part of commonly assigned, co-pending application Ser. No. 07/555,136, filed Jul. 19, 1990, entitled "Vibration Damping Handle Grip and Process for Making Same."

FIELD OF THE INVENTION

This invention pertains to handle grip covers and the process for making them.

BACKGROUND OF THE INVENTION

The use of handle grip covers is well known in various applications including, but not limited to, power tools, hand tools, handle bars, and athletic equipment. These applications generally involve the use of a plastic or rubber-like object placed over the handle during the manufacture of the original equipment or as a replacement grip.

Attempts have been made to improve gripping by providing handles and grips involving the use of a tape, a removable sleeve, an elastomer cured directly to the product's handle, or a sticky substance applied to the hand. For example, a hand grip has been described, in U.S. Pat. No. 4,476,742 as a grooved and ridged tape helically wound onto a handle of sporting equipment, hand tools and other articles generally gripped by hand during use. The tape may be effective in providing a measure of traction and some cushioning effect against the hand of the user; nevertheless, the reference fails to address the grip problems associated with perspiration and wear caused by long periods of use. In addition to this apparent deficiency, tapes of this type are suspect in demanding applications such as in power tools used in the construction industry where handles are subjected to heavy use and rough treatment.

Other suggestions include some form of moulded sleeve, removable or permanent, as a grip shield, handle grip. In U.S. Pat. No. 4,415,954 there is described a sleeve of slip resistant material which is forced over the end of a lubricated handle. This method provides improved gripping and protection from the abrasive action of knurled handles of essentially static items. However, it is impracticle to apply a tight fitting sleeve during use.

Handle grips have also been described in the art (for example, U.S. Pat. Nos. 4,381,579; 4,416,166; and 4,739,674) which provide more comfort and traction for the user, and a means to prevent injuries. Because such handles may be subjected to heavy use however, there is a need to provide a grip constructed of a harder material that is more durable. Generally, the inventions which attempt to address durability are difficult to apply, and expensive.

SUMMARY OF THE INVENTION

The grip cover of the present invention presents a tubular, knitted, braided, or woven fabric, coated with a natural or synthetic elastomer material to overcome the weaknesses of the prior art, as discussed above.

The process for fabricating the grip cover includes placing a tubular shaped material over a form with a non-stick surface, and impregnating the material on the form with an elastomer coating. The tubular shaped material is then cured while on the form. It is finally peeled off of the form and trimmed to the desired length.

The grip cover may be applied to a handle which is part of or attached to one of a manual tool, a power tool, or a piece of athletic equipment.

DETAILED DESCRIPTION OF THE INVENTION

Figure 1C:
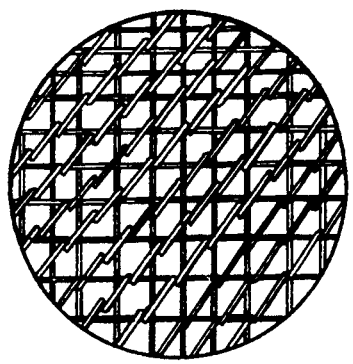
FIGS. 1a, 1b, and 1c are side, cross-sectional, and detailed views of the grip cover of the present invention.
Figure 1B:
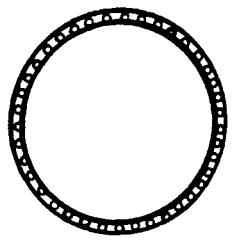
Figure 1A:
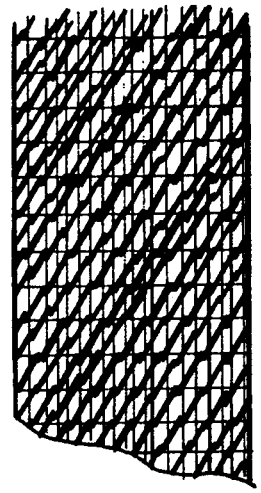
Figure 1A:
Figure 1A:
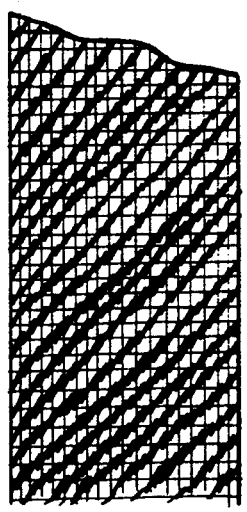

The present invention provides a grip cover, shown in FIG. 1a (detailed in FIG. 1b and 1c), with improved gripping characteristics. The grip cover comprises a tubular, knitted, braided, or woven fabric coated with a natural or synthetic elastomer material.

The tubular substrate fabric may be an elastic or non-elastic fiber. The fibers may include cotton, polyester, nylon, polypropylene, polyurethane, and blends thereof including other elastic fibers, which are arranged by knitting, braiding, or weaving. The fabric may be webbed including a mesh or netting woven of strands that are interlaced and knotted at intervals (such as the "Elastic Dressing Retainer" produced by Zens Health Care Company, Milwaukee, Wis.). The mesh size, as determined by the width of the knotted intervals, may be varied depending upon the user's needs. Typically, the openings are triangular and between about 3 millimeters (0.125 inch) to about 9 millimeters (0.375 inch) per side; the preferred opening is about 6 millimeters (0.25 inch) per side. As an alternative embodiment, the fabric may be moulded connecting fiber strands.

The preferred elastomer coating on the tubular fabric is polychloroprene due to its stability and non-tackiness. However, other materials can be used such as natural rubber, styrene butadiene rubber, nitrile rubber, or silicone rubber preferably in latex, or polymer solutions.

The grip cover is produced by setting the non-elastic tubular, knitted, braided, or woven material onto, or by expanding and placing the elastic material onto, a tube constructed of a non-stick, inert plastic material, preferably TEFLON ® material (polytetrafluoroethulene) (a registered trademark of E. I. DuPont de Nemours & Co. Inc.). The tube should be of similar form as the substrate handle. The tube should be no larger than twice the diameter of the tubular material, so as not to stretch the material beyond its elastic yield point. Once on the tube, the tubular material can be impregnated with a natural or synthetic elastomer by spraying or brushing; dipping is the preferred method of impregnating the tubular material to ensure maximum contact. The material, on the tube, is then dried in an oven at between about 50° C. (120° F.) to about 115° C. (240° F.), preferably 82° C. (180° F.) for about 30 minutes, or until dry. The material is then stripped off of the tube and trimmed for use.

Once fabricated, the tubular coated material is expanded from its original diameter (approximately the same diameter as the tube used during curing) and placed or rolled over a handle grip to an extent sufficient to provide a grip surface to the handle. The material may be employed with an original inside diameter of between about 30% to about 70% of the outside diameter of the substrate handle. In the preferred embodiment the inside diameter of the tubular shaped material is about 50% of the outside diameter of the substrate handle. The tubular shaped material is then relaxed and conforms to the shape of the handle. Although the tubular material performs best with an open weave, either a closer weave or more elastomer coating can be applied resulting in elastomer filled in between the weave, resembling fiber reinforced tubing.

Once fabricated and applied, the grip cover imparts several advantages to the handle. It is easy to apply, or replace, on a wide variety of handles including power and hand tools, athletic equipment, or any other article generally gripped by the hand; it can be customized for any application by trimming it to the exact size and shape required. The present grip cover is relatively inexpensive and does not require additional adhesives, or special fittings to be attached; application is relatively simple and can be performed by the user in the field or the original equipment manufacturer. In addition to the prescribed method, application may also be undertaken with the help of a conventional lubricant which could easily be washed away through the weave. The weblike design provides the user with improved gripping, or traction, on the handle. In addition, the cover is durable under continuous rough use; cuts or tears anywhere in the grip cover will not propagate due to its network-like fabrication. Various size mesh patterns can be utilized, depending on the application and the operator's needs; a broad weave is preferred for vibration damping, while a narrow weave is better for improved gripping. Still another benefit of the grip cover is that the easy application greatly reduces the clean-up and safety problems associated with gummy-surfaced coatings and grips.

The following example is illustrative of the invention which is concerned with a process of making the handle grip cover, as described above. It will be understood that the invention is not limited thereto.

EXAMPLE

Figure 2:
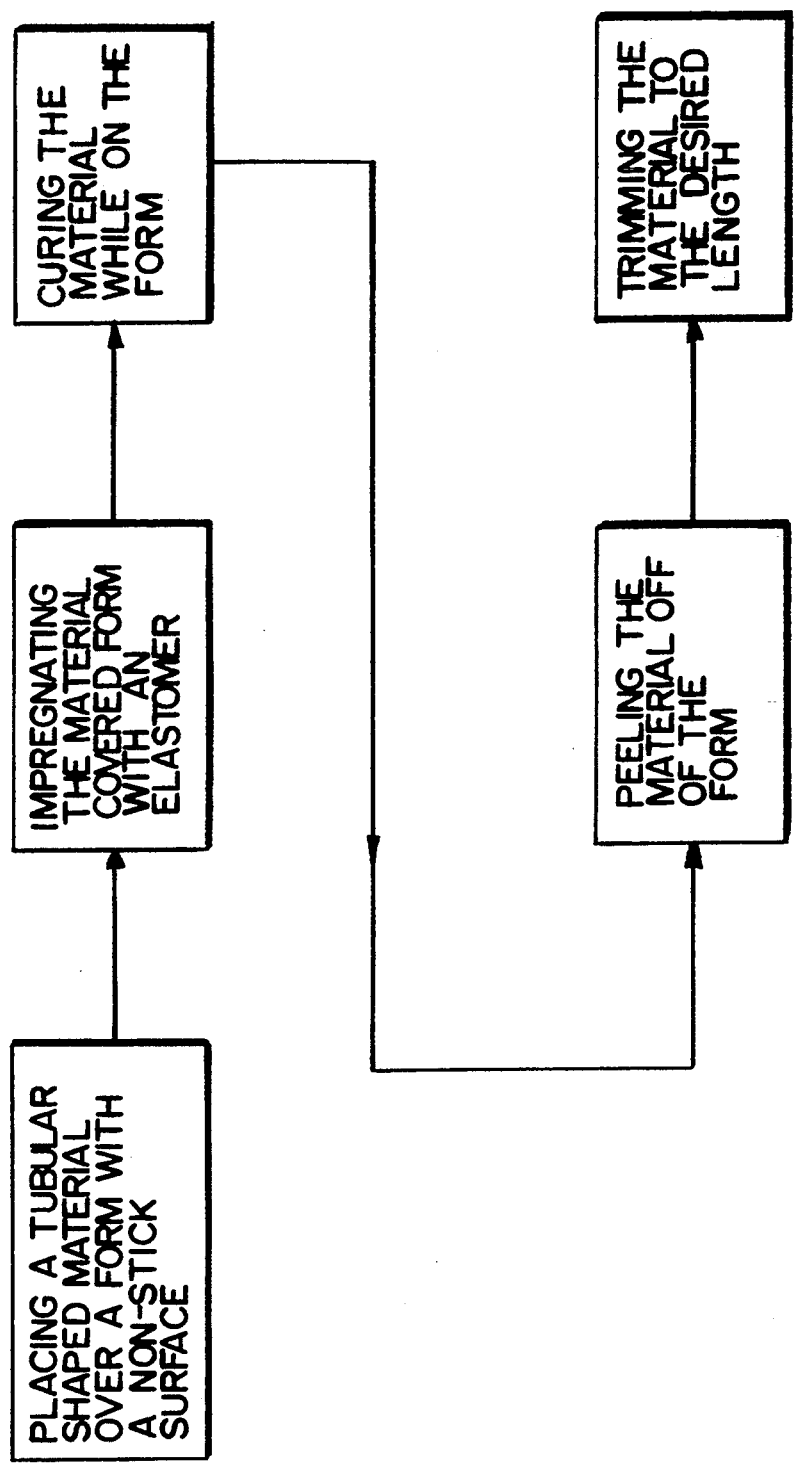
FIG. 2 depicts, in block diagram form, a process of fabricating the grip cover of the present invention.

The block diagram in FIG. 2 depicts the process steps herein described.

The handle grip cover is produced by sliding an elastic dressing retainer (#2 Zens Health Care latex/poly blend mesh tube), with a relaxed inside diameter of about 20 millimeters (0.8 inch), over a form. The elastic dressing retainer is a woven polyester fabric which is interlaced and knotted at intervals of approximately 6 millimeters (0.25 inch) forming a triangular mesh. The form is made of TEFLON ® material coated aluminum or a suitable non-stick surface. The form is about 32 millimeters (1.25 inches), in diameter. After the tube is on the form, it is dipped into an aqueous polychloroprene latex solution. The form is removed from the dip tank, and excess solution is allowed to drain off the tube. The form is then placed into an oven set at about 82° C. (180° F.) for about 30 minutes. After drying, the tube is peeled off the form and trimmed to the desired length. The grip cover has been cut-to-fit baseball bats, tennis racquets, and bicycle handle bars to improve traction and handling for the user.

The grip cover has proven effective in providing easy application on a wide variety of articles generally gripped by the hand. The grip cover's weblike design provides the user with improved traction and durability, while not requiring any additional adhesives or special fittings. Additionally, the grip cover's flexibility allows for various sized mesh patterns and layers, depending on the application and the operator's needs. The present grip cover also appears to be relatively inexpensive, compared to the existing methods and articles. In total, the present invention addresses the need for an inexpensive, easy-to-apply, comfortable, grip cover with improved traction for the user.

What is claimed is:

1. A handle grip cover selected from the group consisting of knitted, braided and woven continuous, elastic, tubular, open weave fabric impregnated with a synthetic or natural elastomer, wherein the fabric is made of strands that are interlaced and knotted.

2. The handle grip cover of claim 1 wherein the fabric is selected from the group consisting of cotton, nylon, polyester, polypropylene, polyurethane, and blends thereof.

3. The handle grip cover of claim 1 wherein the strands are interlaced and knotted at intervals of between about 3 millimeters to about 9 millimeters.

4. The handle grip cover of claim 1 wherein said elastomer is produced from a latex.

5. The handle grip cover of claim 1 wherein said elastomer is produced from a polymer solution.

6. The handle grip cover of claim 1 wherein said elastomer is natural rubber.

7. The handle grip cover of claim 1 wherein said elastomer is styrene butadiene rubber.

8. The handle grip cover of claim 1 wherein said elastomer is nitrile rubber.

9. The handle grip cover of claim 1 wherein said elastomer is silicone rubber.

10. The handle grip cover of claim 1 wherein said elastomer is polychloroprene.

* * * * *